Figure 1:
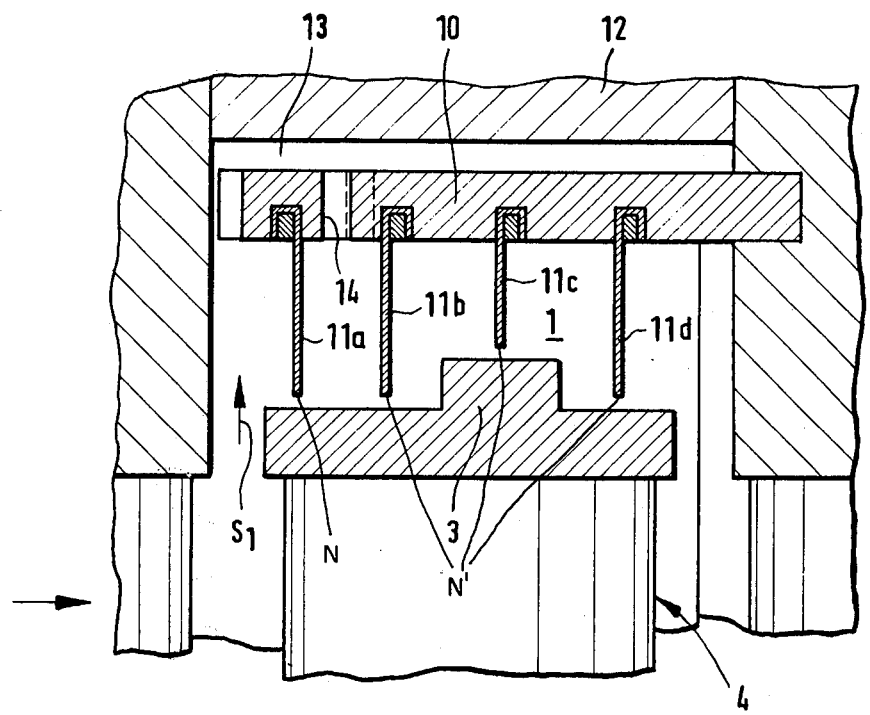

United States Patent [19]

Schwaebel

[11] 4,057,362

[45] Nov. 8, 1977

[54] APPARATUS FOR RAISING THE DYNAMIC PERFORMANCE LIMIT OF STEAM FLOW AND GAS FLOW TURBINES AND COMPRESSORS

[75] Inventor: Rudolf Schwaebel, Nurnberg, Germany

[73] Assignee: Maschinenfabrik Augsburg-Nurnberg AG, Nurnberg, Germany

[21] Appl. No.: 684,105

[22] Filed: May 7, 1976

[30] Foreign Application Priority Data

May 9, 1975 Germany .................. 2520653

[51] Int. Cl.² .................. F01D 11/02; F04D 29/08; F02F 11/00
[52] U.S. Cl. .................. 415/170 R; 415/172 A; 277/53
[58] Field of Search .......... 415/170 R, 172 A, 170 B, 415/DIG. 1; 277/53, 54, 55, 56, 57

[56] References Cited

U.S. PATENT DOCUMENTS

| | | | |
|---|---|---|---|
| 1,463,018 | 7/1923 | Junggren | 277/53 X |
| 2,846,245 | 8/1958 | Weaver | 277/53 UX |
| 3,501,246 | 3/1970 | Hickey | 415/170 R |
| 3,594,010 | 7/1971 | Warth | 415/170 X |
| 3,897,169 | 7/1975 | Fowler | 415/172 A |

FOREIGN PATENT DOCUMENTS

| | | | |
|---|---|---|---|
| 1,087,138 | 8/1960 | Germany | 415/172 A |
| 1,159,227 | 12/1963 | Germany | 415/170 R |

*Primary Examiner*—Carlton R. Croyle
*Assistant Examiner*—Donald S. Holland
*Attorney, Agent, or Firm*—Walter Becker

[57] ABSTRACT

An apparatus for raising the dynamic performance limit of steam flow and gas flow turbines and compressors, in which a non-contacting seal is arranged in a clearance between a stationary wall in the form of a ring and a rotatable member while a non-contacting seal is arranged in the clearing and supported by the ring. The seal forms a labyrinth seal and includes throttling elements. The ring is surrounded by a housing arranged in radially spaced relationship to the ring and defining therewith an annular gap. The labyrinth seal includes an active section and at least one throttling element. The ring is provided with radially extending passages located ahead of the active section of the seal and past at least one of the throttling elements. The dimensions of the passages and of at least one of the throttling elements are so selected that the major portion of the leakage flow is passed into the clearance through the passages.

4 Claims, 2 Drawing Figures

APPARATUS FOR RAISING THE DYNAMIC PERFORMANCE LIMIT OF STEAM FLOW AND GAS FLOW TURBINES AND COMPRESSORS

This invention relates to an apparatus for practicing the method of raising the dynamic performance limit of turbines or compressors which are passed through by steam or gas and have contact-free seals arranged in clearances or gaps between rotating and stationary structural components. By a mixing medium introduced into the clearance zone of the contact-free seals, without or with a negative circumferential component, a circumferential component of the clearance flow defined as positive in the sense of rotation of the vector of the natural vibration is correspondingly reduced. A circumferential component of the clearance flow, which is defined as positive in a direction opposite to the sense of rotation of the vibration vector, is correspondingly increased.

It is an object of this invention to provide a greatly simplified apparatus for carrying out the above mentioned method.

Figure 2:
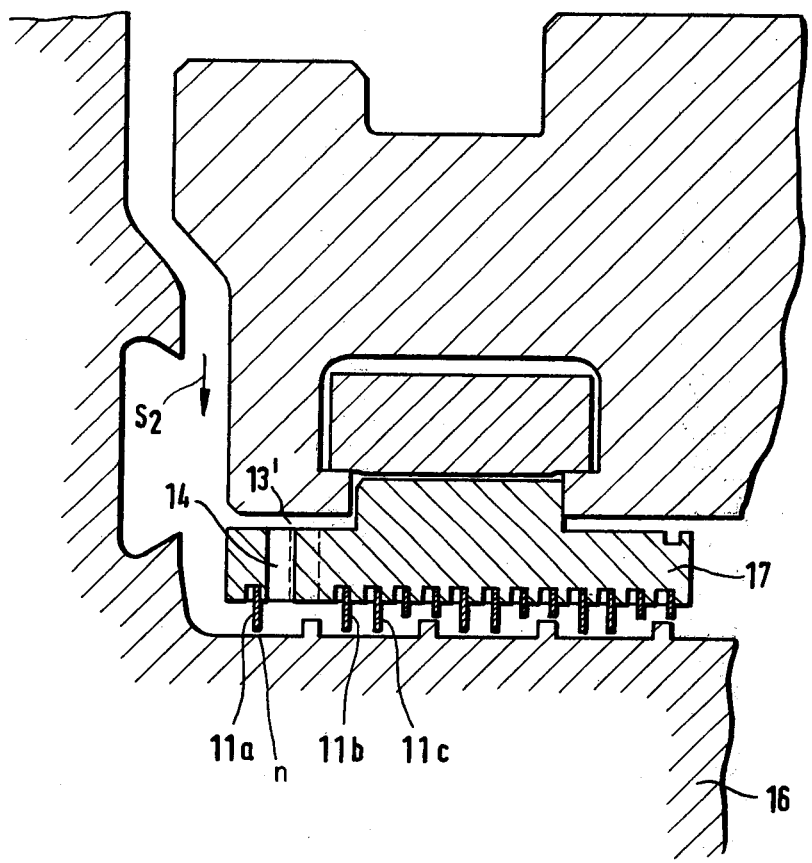

These and other objects and advantages of the present invention will appear more clearly from the following specification in connection with the accompanying drawings, in which:

FIG. 1 shows the configuration according to the invention as applied to the seal in the clearance between the shroud of the wheel and a stationary wall, FIG. 1 showing a cut-out from the longitudinal center section through the rotor axis, and FIG. 2 shows the arrangement according to the invention as applied to the seal in the clearance between the rotor shaft and the inner housing, FIG. 2 being a cut-out from the longitudinal center section through the rotor axis.

The device according to the invention is characterized primarily in that in the ring which carries the seal, there are provided radially or nearly radially directed bores located ahead of the active part of the seal and past one or more preceding throttle elements. The dimensions of said bores and of the preceding throttle elements are so selected that the major portion of the leakage stream is conveyed to said gap through said bores.

Referring now to the drawings in detail and FIG. 1 thereof in particular, a non-contacting seal in the form of a labyrinth seal with seal strips 11a, 11b, 11c, 11d arranged in planes perpendicular to the rotor axis and caulked into the ring 10 is provided in the clearance 1 between a non-rotating wall in the form of a split ring 10 supported by the diaphragm structure and the shroud band 3 of the wheel 4 on the shaft of the rotor in a turbine. The labyrinth seal may take the form of any other known labyrinth seal.

The ring 10 is so arranged that a radial clearance or gap 13 exists between said ring 10 and the non-rotating part 12 surrounding ring 10 which part 12 may be a part of the diaphragm structure or of the inner or outer casing. Radial holes 14 are provided in the ring 10 in the region between the first — seen in the flow direction — strip 11a and the second strip 11b which thus constitutes the start of the active parts of the seal. The purpose of the strip 11a is to discharge the greater part of the clearance flow $S_1$ originating at a preceding guide vane cascade to thereby prevent this portion from directly entering the clearance 1 and the seal respectively. The portion of the leakage flow so discharged is introduced via the radial clearance 13 and the holes 14 into the region of the seal.

The active part 11b, 11c, 11d of the seal may be preceded by several strips (constrictions) serving as deflectors. In such an instance the bores 14 should be located in the region between the innermost strip and the start of the active part of the seal.

If an opposing spin is to be generated, the holes 14 should also be disposed with their axes in the perpendicular plane through the rotor axis, but off-radial which is not specifically shown in the drawing.

In order to make sure that the greater part of the leakage flow is fed to the seals through the bores 14, conditions have to be selected so that the flow resistance of the preceding or the upstream strip (constriction) N or the upstream strips (constrictions) N' is greater than the flow resistance through the bypass path formed by the bores 14.

Along the bypass path through the bores 14, the peripheral component is influenced in the desired sense, i.e. a reduction of the peripheral component of the clearance flow which is defined as positive in the sense or rotation of the vector of the natural vibration, or an increase of the peripheral component of the clearance flow which is defined as positive in a direction opposite to the sense of rotation of the vibration vector. The degree of influence depends on the design data of the specific turbine compressor or pump. However, this dimension can be found without any inventive effort by a person skilled in the design of turbines, compressors, or pumps.

The final peripheral component ahead or upstream of the active part of the seal is the peripheral component averaged over the momentums of the two part flows, namely, the greater flow entering through the bores 14 and the flow which directly enters the seal through the clearance between the preceding strip 11a (or the preceding strips) and the shroud band 3.

The feature described above may also be combined with the feature set out in detail in U.S. Patent application Ser. No. 562,235 Ambrosch et al filed Mar. 26, 1975 (abandoned) now continuation application Ser. No. 723,913 — Ambrosch et al filed Sept. 16, 1976 and belonging to the assignee of the present invention providing for the arrangement of flow-controlling means in the region of the seal.

The configuration shown in FIG. 2 differs from the aforedescribed typical embodiment in so far as the feature serving to increase the dynamic performance limit (preceding constriction (n); bores) is provided in the clearance between the shaft 16 of the rotor and the seal segment 17 of the inner casing shaft seal. The major part of the clearance flow $S_2$ coming from the guide vane cascade of the first stage is forced — because of the upstream strip 11a acting as a throttling element — to a major extent to enter the sealing zone ahead of the active part (11b, 11c . . .) of the seal through the radial clearance 13' and the bores 14 — which are arranged and designed as shown by the example in FIG. 1.

It is, of course, to be understood that the present invention is, by no means, limited to the specific showing in the drawings but also comprises any modifications within the scope of the appended claims.

What I claim is:

1. An apparatus for use in connection with reduction of vibration exciting forces to effect raising of dynamic performance limit of flow in a rotary machine of the turbine and compressor type having a leakage flow, the combination of: rotatable means, stationary wall means in the form of a ring surrounding said rotatable means in radially spaced relationship thereto so as to define therewith an annular clearance, non-contacting sealing means arranged in said clearance and supported by said ring while forming a labyrinth seal including throttling elements, housing means surrounding said ring in radially spaced relationship so as to form therewith an annular gap, said labyrinth seal including an active section and at least one throttling element the improvement comprising that said ring provided with passage means extending from said clearance to said annular gap and being located ahead of said active section of said seal and past at least one of said throttling elements, the dimensions of said passage means and of at least one of said throttling elements being so selected that the major portion of the leakage flow is passed directly into said clearance through said passage means which provide less resistance to flow.

2. An apparatus in combination according to claim 1, in which said labyrinth seal comprises strips connected to said ring and spaced from each other sequentially in the axial direction of said rotatable means while radially extending in planes perpendicular to the axis of rotation of said rotatable means.

3. An apparatus in combination according to claim 2, in which said rotatable means forms the rotor of said rotary machine.

4. An apparatus in combination according to claim 2, in which said rotatable means forms the rotatable shaft of said rotary machine.

* * * * *